US012800826B2

(12) United States Patent
Omoto et al.

(10) Patent No.: US 12,800,826 B2
(45) Date of Patent: Nov. 17, 2026

(54) HOLE ASSISTED FIBER AND DESIGN METHOD

(71) Applicant: NTT, Inc., Tokyo (JP)

(72) Inventors: Kohei Omoto, Musashino (JP); Nobutomo Hanzawa, Musashino (JP); Kazuhide Nakajima, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/709,647

(22) PCT Filed: Dec. 1, 2021

(86) PCT No.: PCT/JP2021/044031
§ 371 (c)(1),
(2) Date: May 13, 2024

(87) PCT Pub. No.: WO2023/100278
PCT Pub. Date: Jun. 8, 2023

(65) Prior Publication Data
US 2026/0160939 A1 Jun. 11, 2026

(51) Int. Cl.
*G02B 6/02* (2006.01)

(52) U.S. Cl.
CPC ..... *G02B 6/02319* (2013.01); *G02B 6/02014* (2013.01)

(58) Field of Classification Search
CPC .................................................. G02B 6/02319
See application file for complete search history.

(56) References Cited

U.S. PATENT DOCUMENTS

2013/0136409 A1* 5/2013 Kumano ............ G02B 6/02366 385/125
2022/0334307 A1 10/2022 Nozoe et al.

FOREIGN PATENT DOCUMENTS

JP 2005338436 A 12/2005
JP 2014186209 A 10/2014
WO WO-2021053766 A1 3/2021

OTHER PUBLICATIONS

K. Shiraki and M. Ohashi, "Optical properties of sodium alminosilicate glass," Journal of Non-Crystalline Solids, vol. 149, Issue 3, Nov. 1, 1992, pp. 243-248.
Y. Tamura, H. Sakuma, K. Morita, M. Suzuki, Y. Yamamoto, K. Shimada, Y. Honma, K. Sohma, T. Fujii and T. Hasegawa, "Lowest-ever 0.1419-dB/km loss optical fiber," OFC2017, Post Deadline Paper, No. Th5d-1, Mar. 2017.

* cited by examiner

*Primary Examiner* — Lisa M Caputo

(57) ABSTRACT

In order to solve the problems, objects of the present invention are to provide a structure of an optical fiber that enables the Rayleigh scattering loss to be reduced and a method for designing the same.
A hole-assisted fiber (HAF) according to the present invention is a HAF, permitting both a small diameter and a large diameter, capable of performing propagation only in a single mode at a wavelength of 1,260 nm to 1,625 nm. The HAF includes: a core region having a uniform refractive index distribution; a uniform cladding region that surrounds the core region; and holes arranged in one to three layers (the number of holes: 6, 18, and 36) in a circumferential direction within the cladding region excluding the core region to be a hexagonal close-packed manner.

5 Claims, 9 Drawing Sheets

[1]

[2]

[3]

[4]

[5]

[6]

[7]

[8]

HOLE ASSISTED FIBER AND DESIGN METHOD

CROSS-REFERENCE TO RELATED APPLICATIONS

This application is a 371 U.S. National Phase of International Application No. PCT/JP2021/044031, filed on Dec. 1, 2021. The entire disclosure of the above application is incorporated herein by reference.

TECHNICAL FIELD

The present disclosure relates to a low-loss hole-assisted optical fiber and a method for designing the same.

BACKGROUND ART

Currently, the development of new information technologies is resulting in a rapid increase in traffic in optical fiber networks. The transmission capacity limit of an existing single mode fiber (SMF) is considered to be about 100 Tbps due to an influence of a non-linear optical effect and a fiber fuse. Therefore, there is a demand for a new large-capacity communications system for future applications.

In order to overcome the transmission capacity limit of the existing SMF and realize a larger-capacity communications system, it is effective to expand a wavelength band to be used and increase the number of multiplexes. In long-distance transmission, it is necessary to use a wavelength band with a small transmission loss, and a wavelength band used is limited as compared with a short-distance network such as an access network. Therefore, a reduction in loss of the wavelength band that cannot be used for long-distance transmission enables the number of wavelength-division multiplexes to be increased and the transmission capacity to be expanded.

However, since the Rayleigh scattering loss, which is a factor in loss of an optical fiber, is inversely proportional to the fourth power of the wavelength, the Rayleigh scattering loss increases at short wavelengths, and a problem arises in that transmission cannot be performed at relay intervals equivalent to those of the long wavelength band. In addition, in the optical fiber design, a dopant such as fluorine or germanium dioxide is added to quartz glass in order to control the refractive index distribution, but the dopant causes composition fluctuations, which cause the Rayleigh scattering loss.

In studies on an optical fiber intended to reduce the Rayleigh scattering loss, an optical fiber using multicomponent glass, a fluorine-added optical fiber, and the like have been reported (see, for example, Non Patent Literature 1 and Non Patent Literature 2).

CITATION LIST

Non Patent Literature

Non Patent Literature 1: K. Shiraki and M. Ohashi, "Optical properties of sodium alminosilicate glass," Journal of Non-Crystalline Solids, Volume 149, Issue 3, 1 Nov. 1992, Pages 243-248.

Non Patent Literature 2: Y. Tamura, H. Sakuma, K. Morita, M. Suzuki, Y. Yamamoto, K. Shimada, Y. Honma, K. Sohma, T. Fujii and T. Hasegawa, "Lowest-ever 0.1419-dB/km loss optical fiber," OFC2017, Post Deadline Paper, No. Th5d-1, March 2017.

SUMMARY OF INVENTION

Technical Problem

It is expected that an optical fiber using multicomponent glass would be able to achieve a reduction in loss, and various studies have been made thereon. However, it is considered that it would be difficult to achieve a reduction in loss due to microcrystal precipitation, mixing of OH groups, and the like during production. Therefore, currently, in order to reduce the Rayleigh scattering loss, it is considered that it is most effective to increase an overlapping area between a pure quartz region and an electric field distribution of an optical fiber.

In general, an optical fiber is configured to include a core region having a high refractive index and a cladding region having a refractive index lower than that of the core region. The refractive index distribution is usually controlled by adding a dopant such as germanium dioxide to the core region to increase the refractive index and forming the cladding region of pure quartz glass. On the other hand, in order to reduce the loss, there is also an optical fiber that includes a core region made of pure quartz glass and has a refractive index distribution controlled by adding fluorine to the cladding region to reduce the refractive index.

However, also in a pure quartz core structure, since it is necessary to reduce a core radius in order to comply with the existing SMF (ITU-T Recommendations G. 652), a loss increases due to the fluorine cladding region. That is, a problem arises in that it is difficult to reduce the transmission loss due to the Rayleigh scattering loss even in the optical fiber having the pure quartz core structure.

In this respect, in order to solve the problems, objects of the present invention are to provide a structure of an optical fiber that enables the Rayleigh scattering loss to be reduced and a method for designing the same.

Solution to Problem

In order to achieve the object, an optical fiber according to the present invention employs a structure having a unimodal (step index) core structure and a one- to three-layer hole-assisted structure.

Specifically, the optical fiber according to the present invention is a hole-assisted optical fiber including:

a core region having a diameter 2a and a uniform refractive index distribution; a uniform cladding region that surrounds the core region and has a relative refractive index difference Δ from the core region; and holes arranged in one layer or a plurality of layers in a circumferential direction within the cladding region excluding the core region to be a hexagonal close-packed manner, in which Condition A is satisfied where Condition A is that a combination of a core radius a and a radius Rin of an inscribed circle inscribed in an innermost layer of the layers of the holes is observed in a left-hand region of $\Delta\alpha R=-0.01$ dB/km, when a ratio $\Delta\alpha R$ is plotted on a graph having the core radius a and the radius Rin as axes, the ratio $\Delta\alpha R$ is a ratio of loss $\alpha R$ to loss $\alpha Rs$, the loss $\alpha R$ is a Rayleigh scattering loss of the hole-assisted optical fiber calculated by varying the core radius a and the radius Rin, the loss $\alpha Rs$ is a Rayleigh scattering loss calculated by varying the core radius a for a normal optical fiber whose structure is the same as the hole-assisted optical fiber except for the absence of holes.

By using a hole-assisted fiber (HAF) structure in which the holes are provided around the core, the bending loss condition of an SMF can be satisfied without newly adding a dopant. The optical fiber according to the present invention can reduce Rayleigh scattering, as compared with the existing SMF, at a wavelength of 1,260 nm to 1,625 nm by appropriately controlling the refractive index distribution and the holes and using a core structure, permitting both a small diameter and a large diameter, and the HAF structure in combination.

[Supplement]

When germanium dioxide is added to the core and the cladding is made of pure quartz, an overlapping area of an electric field distribution and a pure quartz region (cladding) can be expanded and the Rayleigh scattering loss can be reduced, by adopting the small-diameter core structure.

When the core is made of pure quartz and fluorine is added to the cladding, the electric field distribution can be contained in the pure quartz region (core) (the overlapping area with the fluorine-added cladding can be reduced) and the Rayleigh scattering loss can be reduced, by adopting the large-diameter core structure.

For example, in the optical fiber according to the present invention, the holes are six in number and are arranged in a single layer, the relative refractive index difference Δ is 0.25% or more and 0.4% or less, and an occupancy rate S defined by Expression (C1) is 0.42 or more and 0.54 or less, and the combination is observed within a polygon in the graph, the polygon having vertexes of A1 (3.23, 20.00),
A2 (2.25, 15.23),
A3 (2.14, 14.26),
A4 (2.11, 12.00),
A5 (2.14, 10.45),
A6 (2.36, 8.00),
A7 (5.32, 8.00),
A8 (5.05, 9.16),
A9 (4.70, 12.65),
A10 (4.55, 15.16),
A11 (4.57, 18.26), and
A12 (4.50, 20.00).

[Math. C1]

$$S = \frac{6 \times \left(\frac{d}{2}\right)^2}{Rout^2 - Rin^2} \tag{C1}$$

Here, d represents a diameter of the hole, and Rout represents a radius of a circumscribing circle circumscribing the layer of the holes.

For example, in the optical fiber according to the present invention, the holes are eighteen in number and are arranged in two layers, the relative refractive index difference Δ is 0.20% or more and 0.35% or less, and an occupancy rate S defined by expression (C2) is 0.15 or more and 0.25 or less, and the combination is observed within a polygon in the graph, the polygon having vertexes of B1 (2.79, 17.00),
B2 (2.70, 16.00),
B3 (2.27, 14.00),
B4 (2.18, 12.70),
B5 (2.18, 12.10),
B6 (2.32, 10.80),
B7 (2.29, 9.60),
B8 (2.54, 8.00),
B9 (5.21, 8.00),
B10 (4.96, 9.10),
B11 (4.79, 10.80),
B12 (4.77, 12.00),
B13 (4.66, 12.90),
B14 (4.66, 14.50), and
B15 (4.32, 17.00).

[Math. C2]

$$S = \frac{18 \times \left(\frac{d}{2}\right)^2}{Rout^2 - Rin^2} \tag{C2}$$

Here, d represents a diameter of the hole, and Rout represents a radius of a circumscribing circle circumscribing the layer of the holes.

For example, in the optical fiber according to the present invention, the holes are thirty-six in number and are arranged in three layers, the relative refractive index difference Δ is 0.15% or more and 0.40% or less, and an occupancy rate S defined by Expression (C3) is 0.04 or more and 0.18 or less, and the combination is observed within a polygon in the graph, the polygon having vertexes of C1 (2.45, 14.00),
C2 (1.96, 11.80),
C3 (1.86, 11.57),
C4 (2.16, 8.00),
C5 (5.52, 8.00),
C6 (5.45, 8.07),
C7 (5.23, 9.14),
C8 (5.18, 10.86),
C9 (4.50, 12.64), and
C10 (4.21, 14.00).

[Math. C3]

$$S = \frac{36 \times \left(\frac{d}{2}\right)^2}{Rout^2 - Rin^2} \tag{C3}$$

Here, d represents a diameter of the hole, and Rout represents a radius of a circumscribing circle circumscribing the layer of the holes.

The optical fiber is designed as follows.

The method for the designing an hole-assisted optical fiber includes:

calculating a desired bending loss condition, a desired confinement loss condition, and a desired cutoff condition when a core radius a and a radius Rin of an inscribed circle inscribed in an innermost layer of the layers of the holes are changed in any relative refractive index difference Δ and any hole occupancy rate S;

plotting the bending loss condition, the confinement loss condition, and the cutoff condition on a graph having the core radius a and the radius Rin as axes;

calculating a Rayleigh scattering loss of the hole-assisted optical fiber when the core radius a and the radius Rin are changed;

calculating a Rayleigh scattering loss when the core radius a is changed for a normal optical fiber whose structure is the same as the hole-assisted optical fiber except for the absence of holes;

plotting a ratio ΔαR on the graph, which is a ratio of the Rayleigh scattering loss of the hole-assisted optical fiber to the Rayleigh scattering loss of the normal optical fiber;

detecting, on the graph, an overlapping region where a right-hand region of the bending loss condition or the confinement loss condition, a left-hand region of the cutoff condition, and a left-hand region of any ratio ΔαR overlap each other; and defining the core radius a and the radius Rin included in the overlapping region as design values of the hole-assisted optical fiber.

Note that the inventions described above can be combined as far as possible.

Advantageous Effects of Invention

The present invention can provide a structure of an optical fiber capable of reducing the Rayleigh scattering loss and a method for designing the same.

DESCRIPTION OF EMBODIMENTS

Figure 1:
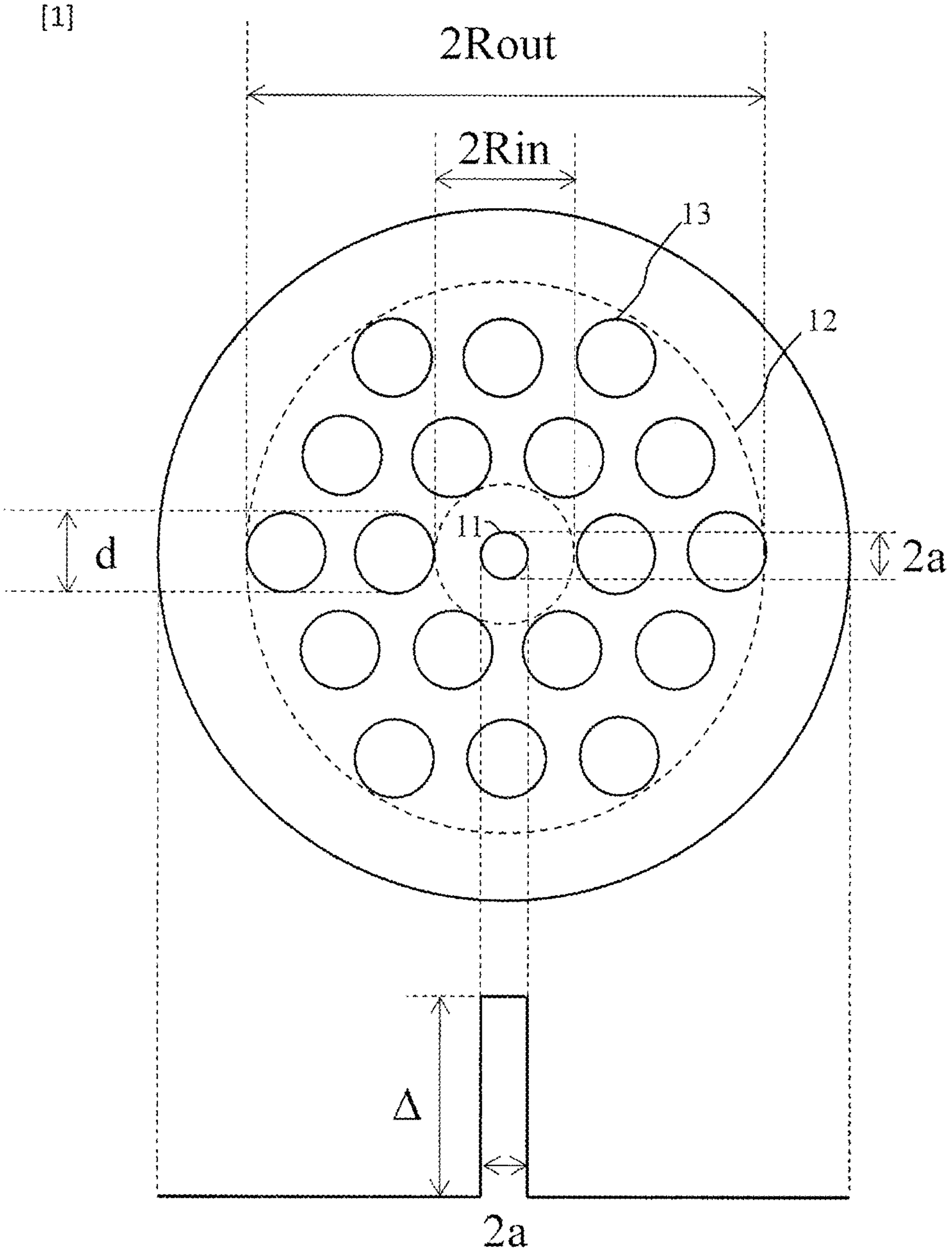
FIG. 1 is a view for explaining a structure of a hole-assisted optical fiber according to the present invention.

Embodiments of the present invention will be described with reference to the accompanying drawings. The embodiments described below are examples of the present invention, and the present invention is not limited to the following embodiments. Components assigned the same reference numerals in the present specification and the drawings are the same components.

Embodiment 1

A HAF, permitting both a small diameter and a large diameter, capable of performing propagation only in a single mode at a wavelength of 1,260 nm to 1,625 nm is designed. The HAF includes: a core region 11 having a uniform refractive index distribution, a uniform cladding region 12 that surrounds the core region 11, and holes 13 arranged in one to three layers (the number of holes: 6, 18 and 36) in a circumferential direction within the cladding region 12 excluding the core region 11 to be a hexagonal close-packed manner. As an example, a structure of a two-layer HAF is illustrated in FIG. 1. Here, a represents a core radius, Δ represents a relative refractive index difference, d represents a hole diameter, Rin represents a radius of an inscribed circle inscribed in the hole layer, Rout represents a radius of a circumscribing circle circumscribing the hole layer, and S represents a hole occupancy rate. The hole occupancy rate S is defined by the following expression.

[Math. 1]

$$S = \frac{6 \times \left(\frac{d}{2}\right)^2}{Rout^2 - Rin^2} \tag{1}$$

Here, N represents the number of holes, and N=18 in the example of the two-layer structure in FIG. 1.

First, the relative refractive index difference Δ and the hole occupancy rate S are fixed, and the core radius a and the inscribed circle radius Rin that satisfy a bending loss condition, a confinement loss condition, and a cutoff condition are searched for. In the calculation, a loss is calculated from a propagation constant using the two-dimensional finite element method. Accordingly, a bending loss or a leakage loss (confinement loss) is calculated from the propagation constant. The conditions are as follows.

(Condition 1) The bending loss condition indicates a region where a loss of a fundamental mode at a wavelength of 1,625 nm and a bending radius of 30 mm is 0.5 dB/100 turns or less.

(Condition 2) The leakage loss condition indicates a region where a loss of the fundamental mode at the wavelength of 1,625 nm is 0.001 dB/km or less.

(Condition 3) The cutoff condition indicates a region where the loss of the first higher mode at a wavelength of 1,260 nm is 1 dB/m or more.

Figure 2:
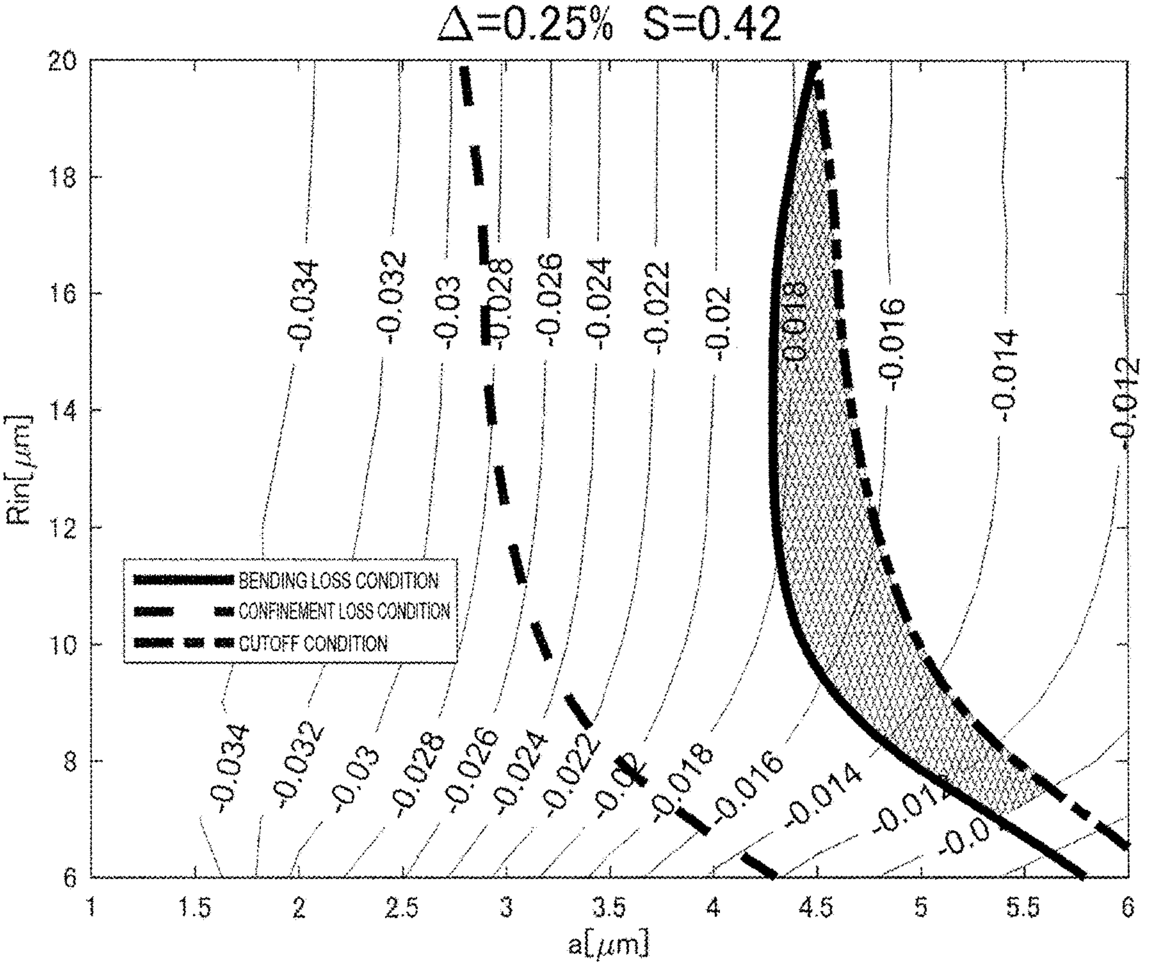
FIG. 2 is a graph for explaining a design guideline of the hole-assisted optical fiber according to the present invention.

As an example, FIG. 2 illustrates curves of the bending loss condition (solid line), the leakage loss (confinement loss) condition (broken line) and the cutoff condition (dot-and-dash line) at a relative refractive index difference Δ of 0.25% and a hole occupancy rate S of 0.42 of a single-layer structure in which germanium dioxide is added to the core and the cladding is made of pure quartz. It is possible to realize the HAF satisfying the condition of the cut-off wavelength in a left-hand region of the dot-and-dash line and the conditions of the bending loss and the confinement loss in a right-hand regions of the solid line and the broken line, respectively. Hence, in FIG. 2, it is possible to realize the HAF satisfying desired characteristics in a region surrounded by the solid line and the dot-and-dash line.

Further, a thin line in FIG. 2 represents a reduction effect ΔαR of the Rayleigh scattering loss. Here, ΔαR was derived by the following procedure. The Rayleigh scattering loss αR can be empirically expressed by Expression (2) by an overlapping area of a power distribution P(x, y) and a Rayleigh scattering coefficient distribution A(x, y).

[Math. 2]

$$\alpha R = \frac{1}{\lambda^4} \cdot \frac{\int\int A(x, y) \cdot P(x, y) dx dy}{\int\int P(x, y) dx dy} \tag{2}$$

The Rayleigh scattering coefficient distribution when fluorine is added to quartz and the Rayleigh scattering coefficient distribution when germanium dioxide is added to quartz can be empirically expressed by Expressions (3) and (4) using the refractive index distribution.

[Math. 3]

$$A(x, y) = A0(1 + 0.41|\Delta|) \quad (3)$$

[Math. 4]

$$A(x, y) = A0(1 + 0.44|\Delta|) \quad (4)$$

Here, A0 represents a Rayleigh scattering coefficient of quartz and is set to 0.8 [dB/km·μm$^4$]. In addition, it is assumed that the Rayleigh scattering loss does not occur in a hole region, and A=0.

At this time, the Rayleigh scattering loss in the HAF structure of the present invention is defined as αR, the Rayleigh scattering loss of an existing optical fiber without using the HAF structure is defined as αRs, and ΔαR is defined by Expression (5).

$$\Delta\alpha R = \alpha R/\alpha Rs \quad \text{[Formula 5]}$$

Here, a calculation wavelength of ΔαR is 1,310 nm, a core radius and Δ of an existing SMF are 4.5 μm and 0.35%, respectively, and αRs is 0.3073 dB/km.

In general, since an optical fiber transmission line having a length of several tens of km or longer is used, a loss-to-noise ratio can be significantly improved if the loss per unit length can be reduced by 0.01 dB/km or more. In this respect, in the HAF of the present invention, ΔαR≤−0.01 dB/km or less is set as a structural condition (condition 4).

In FIG. 2, a shaded region in the drawing has a structure capable of simultaneously satisfying all Conditions 1 to 4.

That is, the optical fiber of the embodiment is the hole-assisted optical fiber including the core region 11 having a diameter 2a and a uniform refractive index distribution, the uniform cladding region 12 that surrounds the core region 11 and has the relative refractive index difference Δ from the core region 11; and the holes 13 arranged in a single layer or a plurality of layers in a circumferential direction within the cladding region 12 excluding the core region 11 to be a hexagonal close-packed manner, in which Condition A is satisfied. Condition A is that a combination of a core radius a and a radius Rin of an inscribed circle inscribed in an innermost layer of the layers of the holes is observed in a left-hand region of ΔαR=−0.01 dB/km, when a ratio ΔαR is plotted on a graph having the core radius a and the radius Rin as axes, the ratio ΔαR is a ratio of loss αR to loss αRs, the loss αR is a Rayleigh scattering loss of the hole-assisted optical fiber calculated by varying the core radius a and the radius Rin, the loss αRs is a Rayleigh scattering loss calculated by varying the core radius a for a normal optical fiber whose structure is the same as the hole-assisted optical fiber except for the absence of holes.

Example 1

Figure 3:
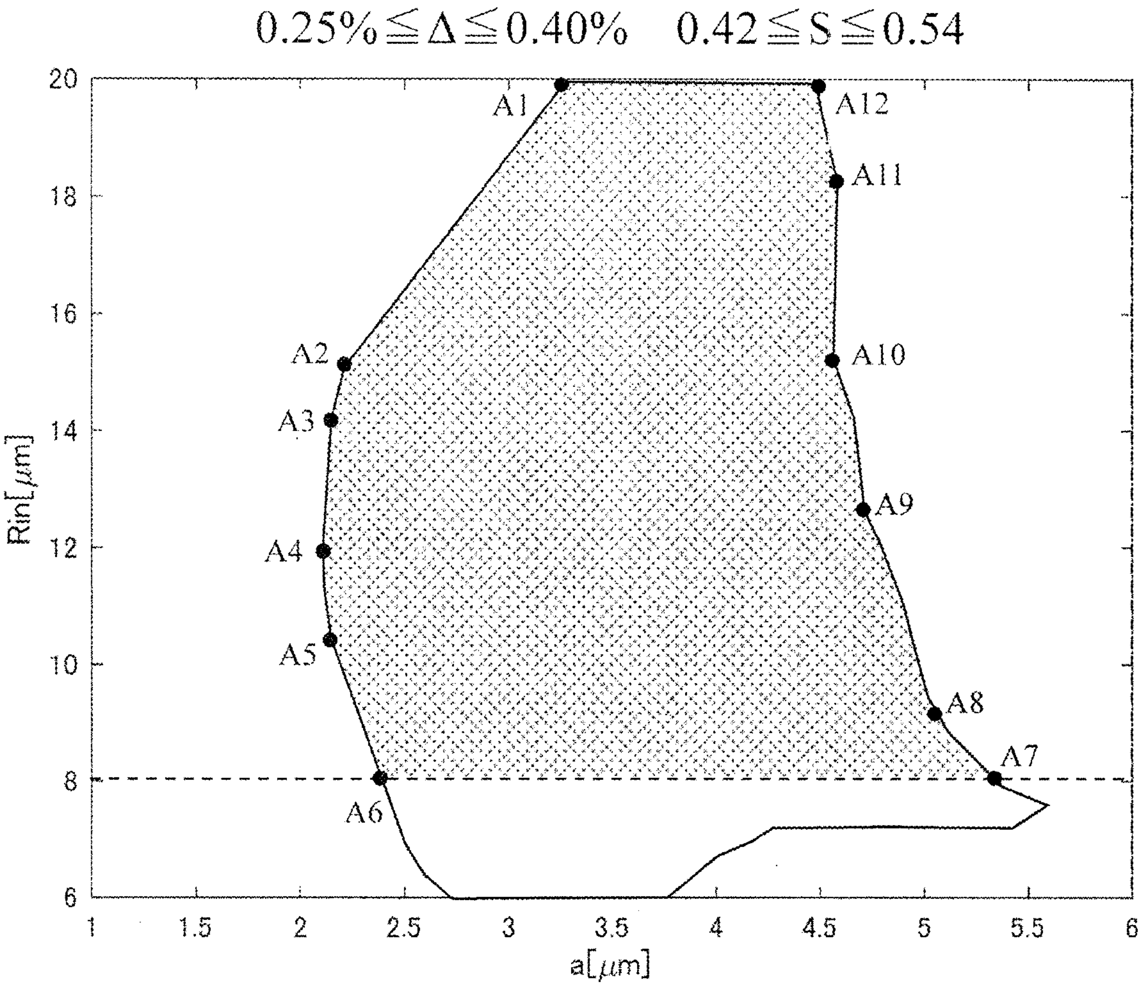
FIG. 3 is a graph for explaining a design region of a single-layer hole-assisted optical fiber according to the present invention.

In the case of the single-layer structure in which germanium dioxide is added to the core and the cladding is made of pure quartz, the result of the similar design region derived by changing S from 0.42 to 0.54 and Δ from 0.25% to 0.40% is illustrated in FIG. 3. A desired characteristic is realized in a region surrounded by a solid line in the drawing. Here, in a case where Rin is 8 μm or less, a mode field diameter is also limited to approximately 8 μm or less, and a connection loss with the existing SMF becomes apparent. Therefore, in the HAF of the present invention, Rin is set to 8 μm or more.

In other words, in the HAF of the example, the holes are six in number and are arranged in a single layer (N=6), the relative refractive index difference Δ is 0.25% or more and 0.4% or less, and an occupancy rate S defined by Expression (1) is 0.42 or more and 0.54 or less, and the combination is observed within a polygon in the graph, the polygon having vertexes of A1 (3.23, 20.00),
A2 (2.25, 15.23),
A3 (2.14, 14.26),
A4 (2.11, 12.00),
A5 (2.14, 10.45),
A6 (2.36, 8.00),
A7 (5.32, 8.00),
A8 (5.05, 9.16),
A9 (4.70, 12.65),
A10 (4.55, 15.16),
A11 (4.57, 18.26), and
A12 (4.50, 20.00).

Hence, in the HAF having a single-layer structure of the present invention, it is possible to realize the desired characteristic by setting Δ in a range of 0.25 to 0.40%, S in a range of 0.42 to 0.54, Rin in a range of 8 to 20 μm, and a in a range of 2.0 to 5.5 μm. The upper limit value of Rin is set to 20 μm as a value at which all of the holes can be prepared in the cladding region at all of S set within the above range.

Example 2

Figure 4:
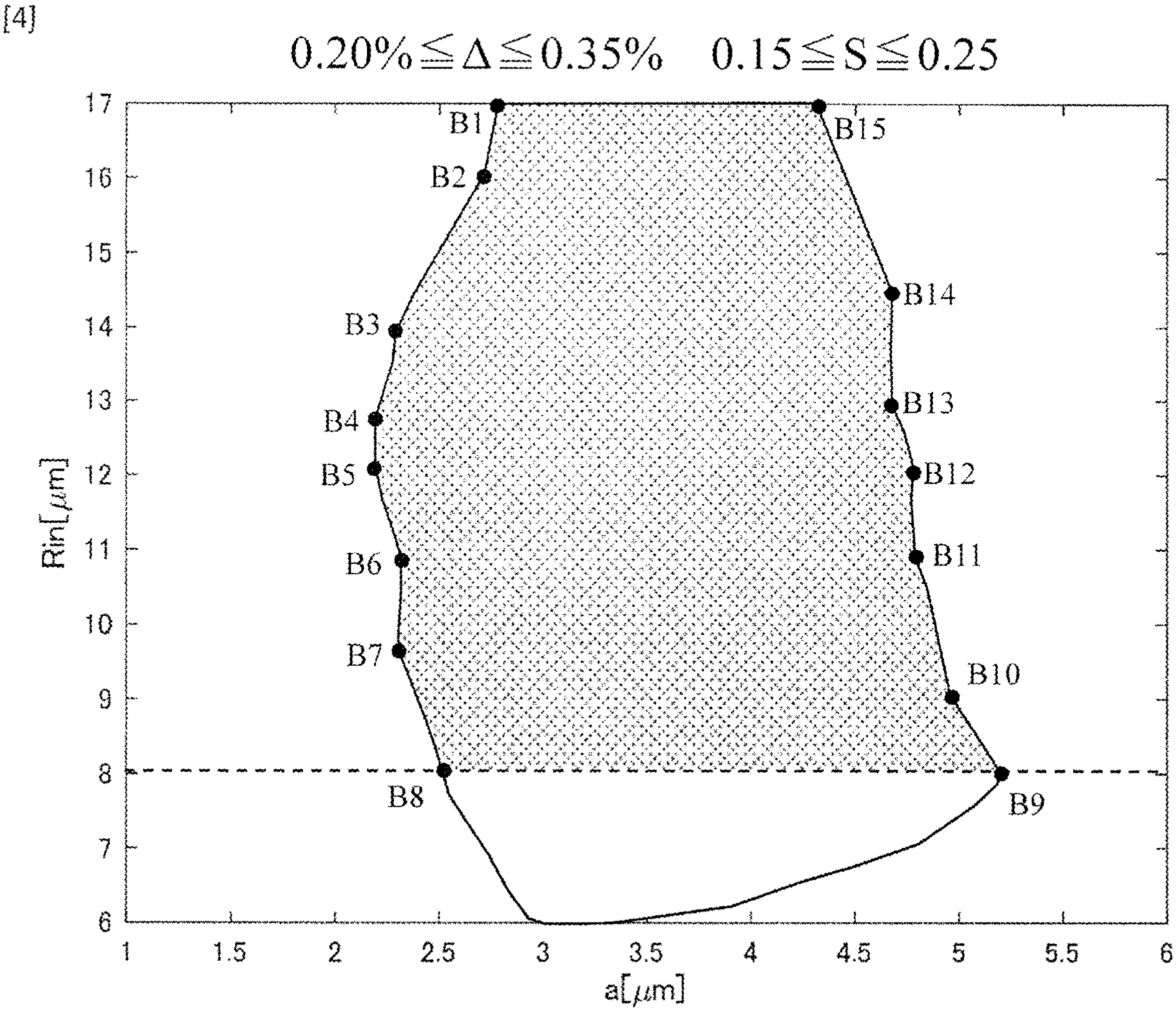
FIG. 4 is a graph for explaining a design region of a two-layer hole-assisted optical fiber according to the present invention.

In the case of the two-layer structure in which germanium dioxide is added to the core and the cladding is made of pure quartz, the result of the similar design region derived by changing S from 0.15 to 0.25 and A from 0.20% to 0.35% is illustrated in FIG. 4. The lower limit of Rin is also the same as in Example 1. The upper limit of Rin is set to 17 μm as a value at which all of the holes can be prepared in the cladding region at all of S set within the above range.

In other words, in the HAF of the example, the holes are eighteen in number and are arranged in two layers (N=18), the relative refractive index difference Δ is 0.20% or more and 0.35% or less, and an occupancy rate S defined by Expression (1) is 0.15 or more and 0.25 or less, and the combination is observed within a polygon in the graph, the polygon having vertexes of B1 (2.79, 17.00),
B2 (2.70, 16.00),
B3 (2.27, 14.00),
B4 (2.18, 12.70),
B5 (2.18, 12.10),
B6 (2.32, 10.80),
B7 (2.29, 9.60),
B8 (2.54, 8.00),
B9 (5.21, 8.00),
B10 (4.96, 9.10),
B11 (4.79, 10.80), B12 (4.77, 12.00),
B13 (4.66, 12.90),
B14 (4.66, 14.50), and
B15 (4.32, 17.00).

Example 3

Figure 5:
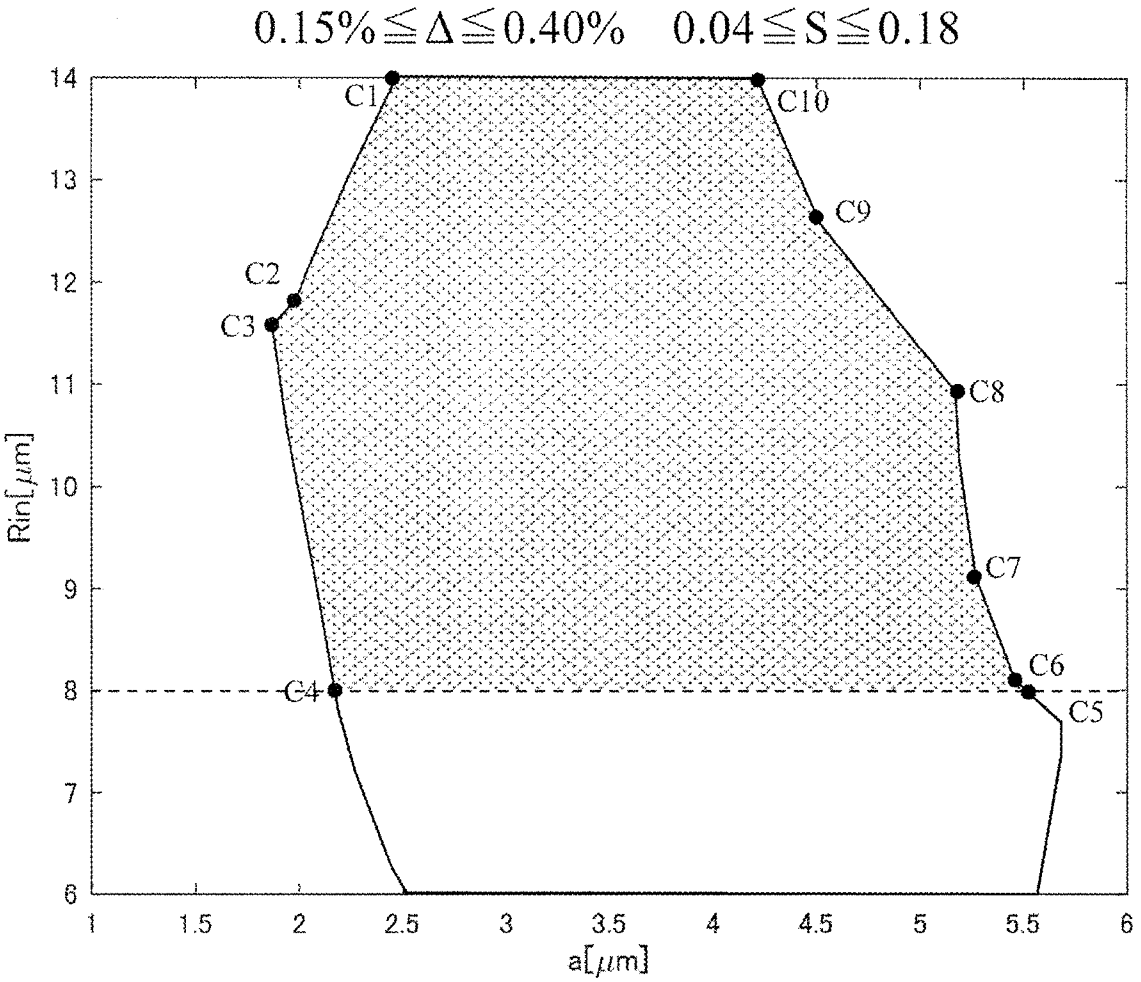
FIG. 5 is a graph for explaining a design region of a three-layer hole-assisted optical fiber according to the present invention.

In the case of the three-layer structure in which germanium dioxide is added to the core and the cladding is made of pure quartz, the result of the similar design region derived by changing S from 0.04 to 0.18 and Δ from 0.15% to 0.4% is illustrated in FIG. 5. The lower limit of Rin is also the same as in Example 1. The upper limit of Rin is set to 14 μm as a value at which all of the holes can be prepared in the cladding region at all of S set within the above range.

In other words, in the HAF of the example, the holes are thirty-six in number and are arranged in three layers (N=36), the relative refractive index difference Δ is 0.15% or more and 0.40% or less, and an occupancy rate S defined by Expression (1) is 0.04 or more and 0.18 or less, and the combination is observed within a polygon in the graph, the polygon having vertexes of C1 (2.45, 14.00),
C2 (1.96, 11.80),
C3 (1.86, 11.57),
C4 (2.16, 8.00),
C5 (5.52, 8.00),
C6 (5.45, 8.07),
C7 (5.23, 9.14),
C8 (5.18, 10.86),
C9 (4.50, 12.64), and
C10 (4.21, 14.00).

Figure 6:
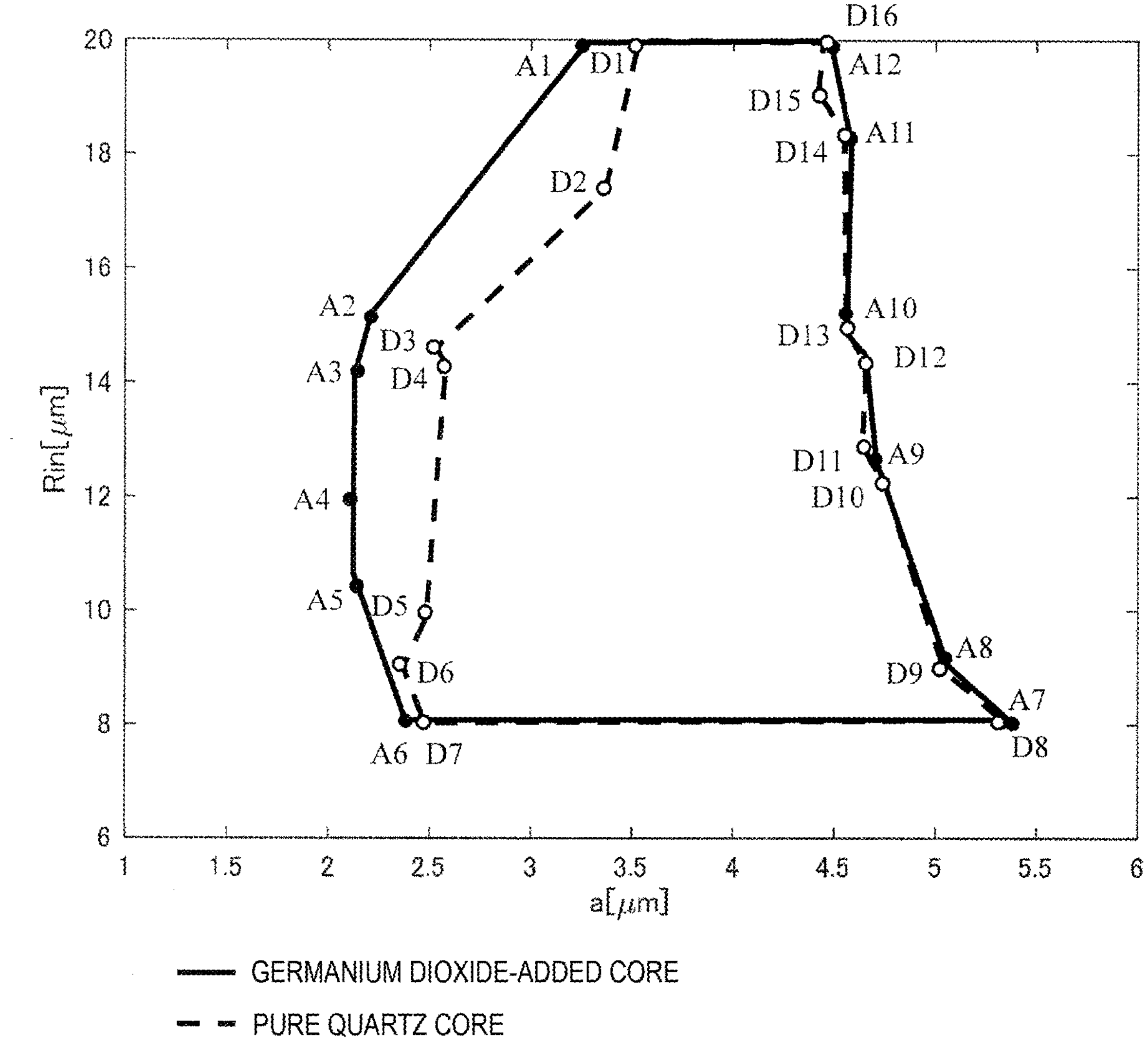
FIG. 6 is a graph for explaining a design region of the single-layer hole-assisted optical fiber according to the present invention.
Figure 7:
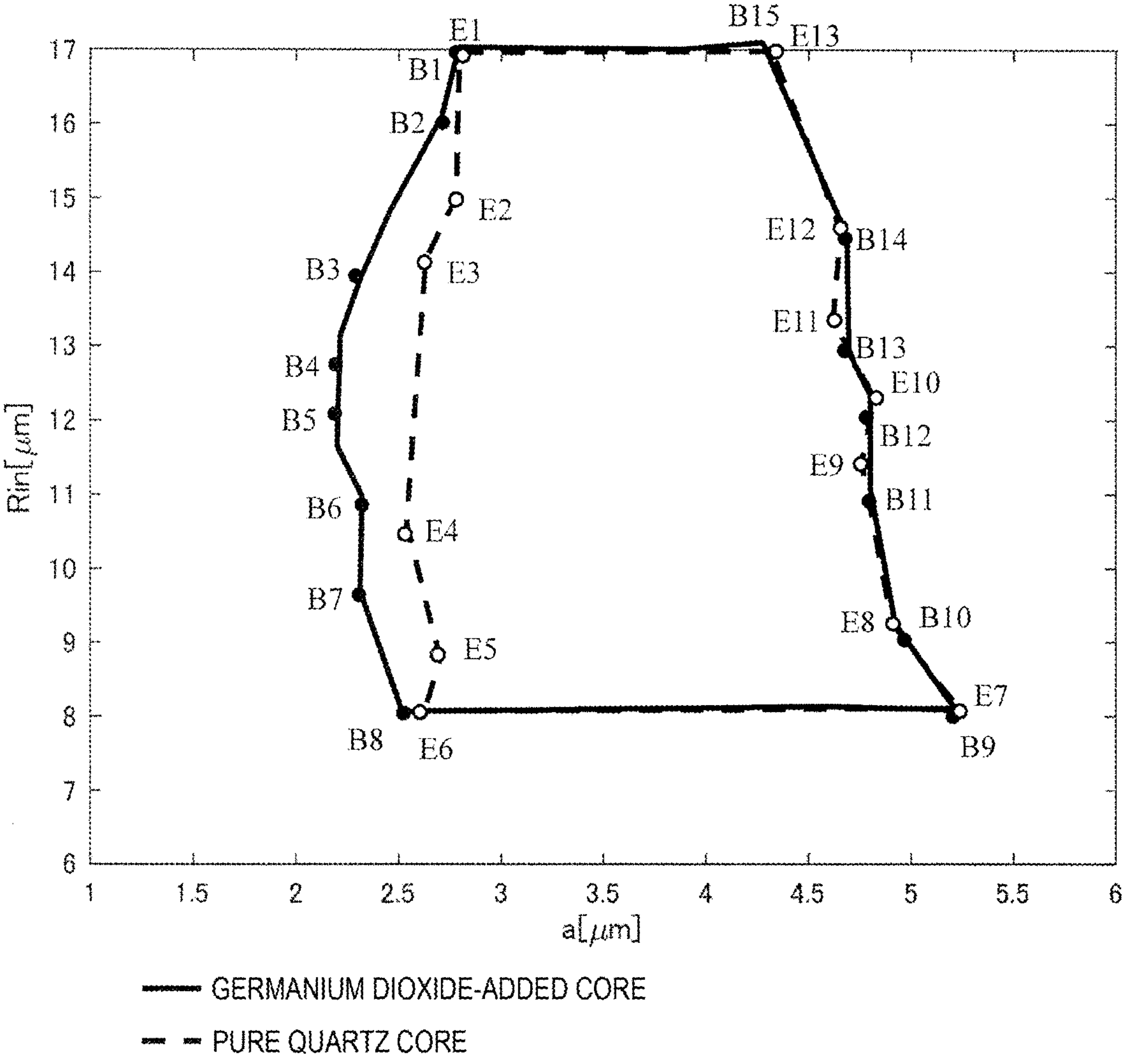
FIG. 7 is a graph for explaining a design region of the two-layer hole-assisted optical fiber according to the present invention.
Figure 8:
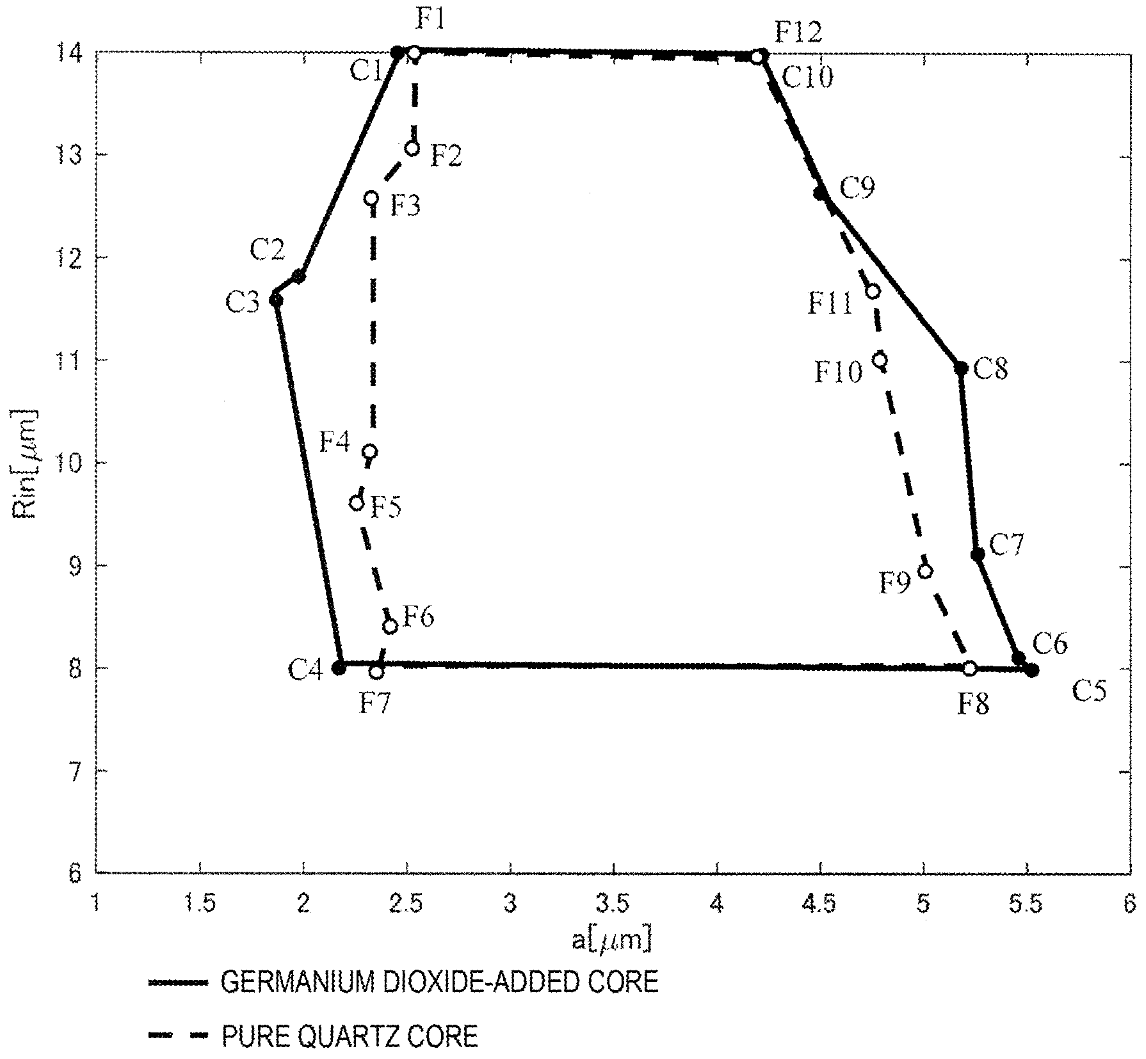
FIG. 8 is a graph for explaining a design region of the three-layer hole-assisted optical fiber according to the present invention.

In the above examples, the HAF, in which germanium dioxide is added to the core and the cladding is made of pure quartz, has been described, but in the HAF of the present invention, instead of adding germanium to the core, the core may be made of pure quartz and fluorine may be added to the cladding. FIGS. 6 to 8 illustrate a comparison between a design region in the case where germanium dioxide is added to the core and the cladding is made of pure quartz and a design region in a case where the core is made of pure quartz and fluorine is added to the cladding.

Example 4

FIG. 6 illustrates a design range (a, Rin) of an HAF having a core made of pure quartz, in which the holes are six in number and are arranged in a single layer (N=6), the relative refractive index difference Δ is 0.25% or more and 0.4% or less, and the occupancy rate S defined by Expression (1) is 0.42 or more and 0.54 or less.

The design range extends to

D1 (3.50, 20.00),
D2 (3.38, 17.48),
D3 (2.54, 14.65),
D4 (2.59, 14.26),
D5 (2.50, 10.00),
D6 (2.36, 9.10),
D7 (2.46, 8.00),
D8 (5.32, 8.00),
D9 (5.04, 9.03),
D10 (4.75, 12.26),
D11 (4.64, 12.90),
D12 (4.66, 14.26),
D13 (4.55, 15.03),
D14 (4.55, 18.39),
D15 (4.45, 19.10), and
D16 (4.48, 20.00).

Example 5

FIG. 7 illustrates a design range (a, Rin) of an HAF having a core made of pure quartz, in which the holes are eighteen in number and are arranged in two layers (N=18), the relative refractive index difference Δ is 0.20% or more and 0.35% or less, and the occupancy rate S defined by Expression (1) is 0.15 or more and 0.25 or less.

The design range extends to

E1 (2.28, 17.00),
E2 (2.82, 15.00),
E3 (2.63, 14.15),
E4 (2.54, 10.45),
E5 (2.70, 8.80),
E6 (2.61, 8.00),
E7 (5.25, 8.00),
E8 (4.91, 9.25),
E9 (4.77, 11.40),
E10 (4.86, 12.25),
E11 (4.63, 13.35),
E12 (4.66, 14.60), and
E13 (4.36, 17.00).

Example 6

FIG. 8 illustrates a design range (a, Rin) of an HAF having a core made of pure quartz, in which the holes are thirty-six in number and are arranged in two layers (N=36), the relative refractive index difference Δ is 0.15% or more and 0.40% or less, and the occupancy rate S defined by Expression (1) is 0.04 or more and 0.18 or less.

The design range extends to

F1 (2.54, 14.00),
F2 (2.54, 13.7),
F3 (2.36, 12.57),
F4 (2.36, 10.11),
F5 (2.25, 9.64),
F6 (2.43, 8.39),
F7 (2.36, 8.00),
F8 (5.23, 8.00),
F9 (5.00, 9.00),
F10 (4.79, 11.00),
F11 (4.75, 11.64), and
F12 (4.20, 14.00).

Embodiment 2

Figure 9:
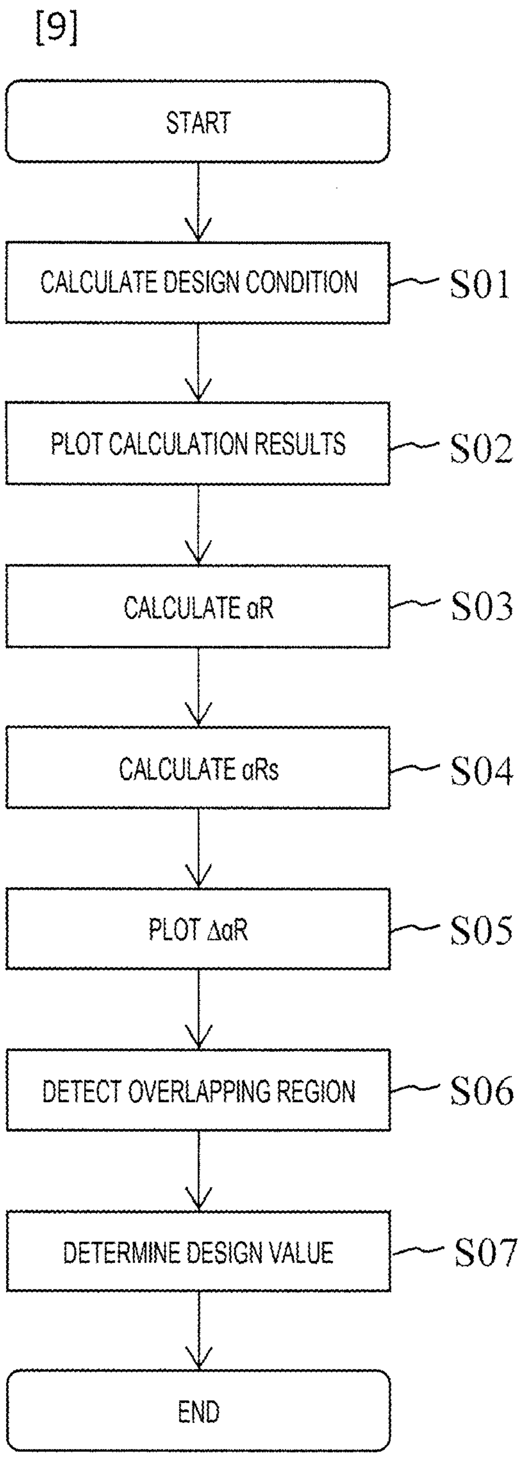
FIG. 9 is a flowchart illustrating a method for designing a hole-assisted optical fiber according to the present invention.

FIG. 9 is a flowchart illustrating a method for designing the HAF of Embodiment 1.

The method for designing the HAF includes calculating a desired bending loss condition, a desired confinement loss condition, and a desired cutoff condition when a core radius a and a radius Rin of an inscribed circle inscribed in an innermost layer of the layers of the holes are changed in any relative refractive index difference Δ and any hole occupancy rate S (Step S01), plotting the bending loss condition, the confinement loss condition, and the cutoff condition on a graph having the core radius a and the radius Rin as axes (Step S02), calculating a Rayleigh scattering loss of the hole-assisted optical fiber when the core radius a and the radius Rin are changed (Step S03), calculating a Rayleigh scattering loss when the core radius a is changed for a normal optical fiber whose structure is the same as the hole-assisted optical fiber except for the absence of holes (Step S04), plotting a ratio ΔαR on the graph, which is a ratio of the Rayleigh scattering loss of the hole-assisted optical fiber to the Rayleigh scattering loss of the normal optical fiber (Step S05), detecting, on the graph, an overlapping region where a right-hand region of the bending loss condition or the confinement loss condition, a left-hand region of the cutoff condition, and a left-hand region of any ratio ΔαR overlap each other (Step S06), and defining the core radius a and the radius Rin included in the overlapping region as design values of the hole-assisted optical fiber (Step S07).

REFERENCE SIGNS LIST

11 Core region
12 Cladding region
13 Hole

The invention claimed is:

1. A hole-assisted optical fiber comprising:

a core region having a diameter 2a and a uniform refractive index distribution;

a uniform cladding region that surrounds the core region and has a relative refractive index difference Δ from the core region; and holes arranged in a single layer or a plurality of layers in a circumferential direction within the cladding region excluding the core region to be a hexagonal close-packed manner, wherein Condition A is satisfied where Condition A is that a combination of a core radius a and a radius Rin of an inscribed circle inscribed in an innermost layer of the layers of the holes is observed in a left-hand region of ΔαR=−0.01 dB/km, when a ratio ΔαR is plotted on a graph having the core radius a and the radius Rin as axes, the ratio ΔαR is a ratio of loss αR to loss αRs and 0.01≤ΔαR≤0.034, the loss αR is a Rayleigh scattering loss of the hole-assisted optical fiber calculated by varying the core radius a and the radius Rin, the loss αRs is a Rayleigh scattering loss calculated by varying the core radius a for a normal optical fiber whose structure is the same as the hole-assisted optical fiber except for the absence of holes.

2. The hole-assisted optical fiber according to claim 1, wherein the holes are six in number and are arranged in a single layer, wherein the relative refractive index difference Δ is 0.25% or more and 0.4% or less, and an occupancy rate S defined by Expression (C1) is 0.42 or more and 0.54 or less, wherein the combination is observed within a polygon in the graph, the polygon having vertexes of A1 (3.23, 20.00),
A2 (2.25, 15.23),
A3 (2.14, 14.26),
A4 (2.11, 12.00),
A5 (2.14, 10.45),
A6 (2.36, 8.00),
A7 (5.32, 8.00),
A8 (5.05, 9.16),
A9 (4.70, 12.65),
A10 (4.55, 15.16),
A11 (4.57, 18.26),
A12 (4.50, 20.00), and

[Math. C1]

$$S = \frac{6 \times \left(\frac{d}{2}\right)^2}{Rout^2 - Rin^2} \tag{C1}$$

wherein, d represents a diameter of the hole, and Rout represents a radius of a circumscribing circle circumscribing the layer of the holes.

3. The hole-assisted optical fiber according to claim 1, wherein the holes are eighteen in number and are arranged in two layers, wherein the relative refractive index difference Δ is 0.20% or more and 0.35% or less, and an occupancy rate S defined by expression (C2) is 0.15 or more and 0.25 or less, wherein the combination is observed within a polygon in the graph, the polygon having vertexes of B1 (2.79, 17.00),
B2 (2.70, 16.00),
B3 (2.27, 14.00),
B4 (2.18, 12.70),
B5 (2.18, 12.10),
B6 (2.32, 10.80),
B7 (2.29, 9.60),
B8 (2.54, 8.00),
B9 (5.21, 8.00),
B10 (4.96, 9.10),
B11 (4.79, 10.80),
B12 (4.77, 12.00),
B13 (4.66, 12.90),
B14 (4.66, 14.50),
B15 (4.32, 17.00), and

[Math. C2]

$$S = \frac{18 \times \left(\frac{d}{2}\right)^2}{Rout^2 - Rin^2} \tag{C2}$$

wherein, d represents a diameter of the hole, and Rout represents a radius of a circumscribing circle circumscribing the layers of the holes.

4. The hole-assisted optical fiber according to claim 1, wherein the holes are thirty-six in number and are arranged in three layers, wherein the relative refractive index difference Δ is 0.15% or more and 0.40% or less, and an occupancy rate S defined by Expression (C3) is 0.04 or more and 0.18 or less, wherein the combination is observed within a polygon in the graph, the polygon having vertexes of C1 (2.45, 14.00),
C2 (1.96, 11.80),
C3 (1.86, 11.57),
C4 (2.16, 8.00),
C5 (5.52, 8.00),
C6 (5.45, 8.07),
C7 (5.23, 9.14),
C8 (5.18, 10.86),

C9 (4.50, 12.64),

C10 (4.21, 14.00), and

[Math. C3]

$$S = \frac{36 \times \left(\frac{d}{2}\right)^2}{Rout^2 - Rin^2} \quad (C3)$$

wherein, d represents a diameter of the hole, and Rout represents a radius of a circumscribing circle circumscribing the layers of the holes.

5. A method for designing a hole-assisted optical fiber, wherein the hole-assisted optical fiber has a structure including a core region having a diameter 2a and a uniform refractive index distribution, a uniform cladding region that surrounds the core region and has a relative refractive index difference Δ from the core region, and holes arranged in a single layer or a plurality of layers in a circumferential direction within the cladding region excluding the core region to be a hexagonal close-packed manner, and wherein the method comprises:

calculating a desired bending loss condition, a desired confinement loss condition, and a desired cutoff condition when a core radius a and a radius Rin of an inscribed circle inscribed in an innermost layer of the layers of the holes are changed in any relative refractive index difference Δ and any hole occupancy rate S;

plotting the bending loss condition, the confinement loss condition, and the cutoff condition on a graph having the core radius a and the radius Rin as axes;

calculating a Rayleigh scattering loss of the hole-assisted optical fiber when the core radius a and the radius Rin are changed;

calculating a Rayleigh scattering loss when the core radius a is changed for a normal optical fiber whose structure is the same as the hole-assisted optical fiber except for the absence of holes;

plotting a ratio ΔαR on the graph, which is a ratio of the Rayleigh scattering loss of the hole-assisted optical fiber to the Rayleigh scattering loss of the normal optical fiber, $0.01 \leq \Delta\alpha R \leq 0.034$;

detecting, on the graph, an overlapping region where a right-hand region of the bending loss condition or the confinement loss condition, a left-hand region of the cutoff condition, and a left-hand region of any ratio ΔαR overlap each other; and defining the core radius a and the radius Rin included in the overlapping region as design values of the hole-assisted optical fiber.

* * * * *